United States Patent [19]

Serrano

[11] 4,232,790

[45] Nov. 11, 1980

[54] STORAGE AND DISPLAY DEVICE FOR RECORD ALBUMS AND TAPES

[76] Inventor: Rudy C. Serrano, 1739 N. Leafdale St., South El Monte, Calif. 91733

[21] Appl. No.: 795,923

[22] Filed: May 11, 1977

[51] Int. Cl.² .............................................. A47F 7/00
[52] U.S. Cl. ..................................... 211/40; 211/163
[58] Field of Search ................ 211/40, 163, 166, 131, 211/86, 96, 95, 115; 248/159, 158, 290, 289 R, 221.2, 221.4

[56] References Cited

U.S. PATENT DOCUMENTS

| D. 195,412 | 6/1963 | Vernik | D6/185 |
|---|---|---|---|
| 568,905 | 10/1896 | Holmes | 248/290 X |
| 1,412,664 | 4/1922 | May | 211/40 |
| 1,421,391 | 7/1922 | Bower | 211/40 |
| 2,868,386 | 1/1959 | Seyforth | 248/220.4 X |
| 2,941,669 | 6/1960 | Palay et al. | 211/86 X |
| 3,033,377 | 5/1962 | Inman | 248/290 X |
| 3,092,256 | 6/1963 | Vernik | 211/40 |
| 3,998,334 | 12/1976 | Smith | 211/163 X |

FOREIGN PATENT DOCUMENTS

| 817116 | 7/1959 | United Kingdom | 211/169 |
|---|---|---|---|
| 1389998 | 4/1975 | United Kingdom | 248/221.4 |
| 1444525 | 8/1976 | United Kingdom | 248/221.2 |

Primary Examiner—Roy D. Frazier
Attorney, Agent, or Firm—Boniard I. Brown

[57] ABSTRACT

A device to support and display phonograph albums and tapes having a central, substantially stationary, mounting post arranged to have mounted thereon a plurality of cylindrical, tubular housings adapted to removably receive one or more radially extending brackets formed to support albums or tapes thereon, the brackets and their related tubular housings define a rack that rotates about the central mounting post in an individual manner, wherein each tubular housing rests on a rotatable hub supported by the central post, the brackets being formed by a pair of parallel, juxtapositioned frame members coupled together by an elongated support track, and wherein the frame members are flexible to create a spring-like action to hold the brackets in place within predetermined apertures formed in the tubular housing.

10 Claims, 9 Drawing Figures

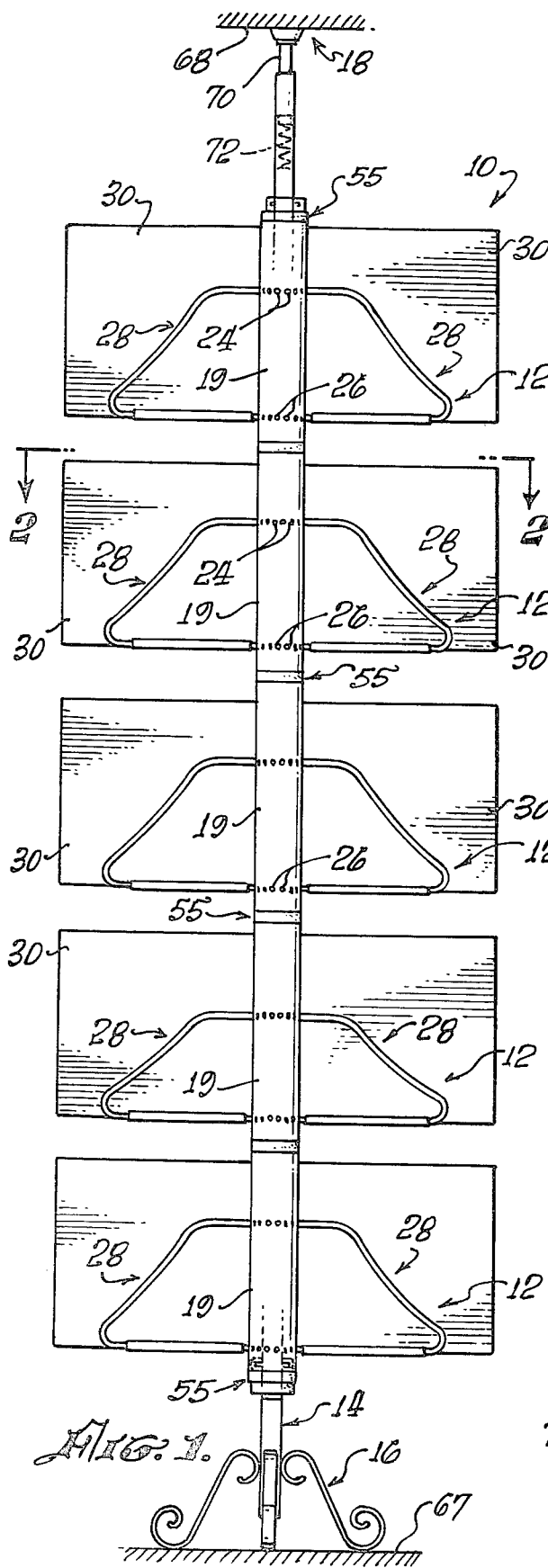
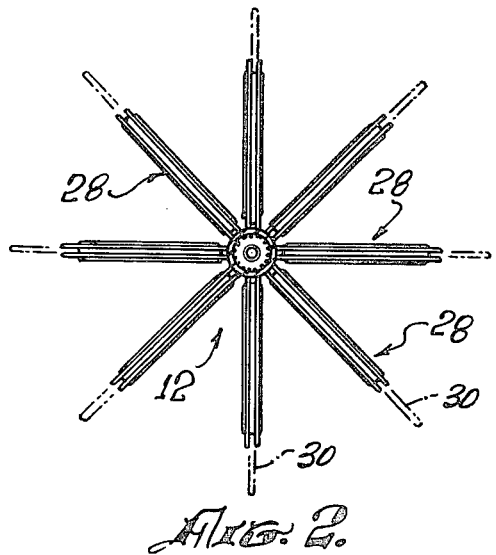
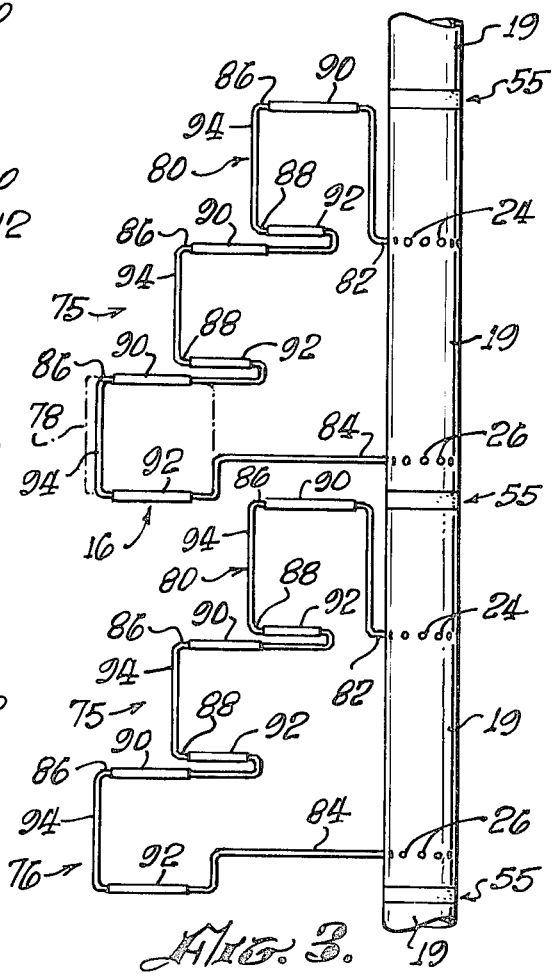

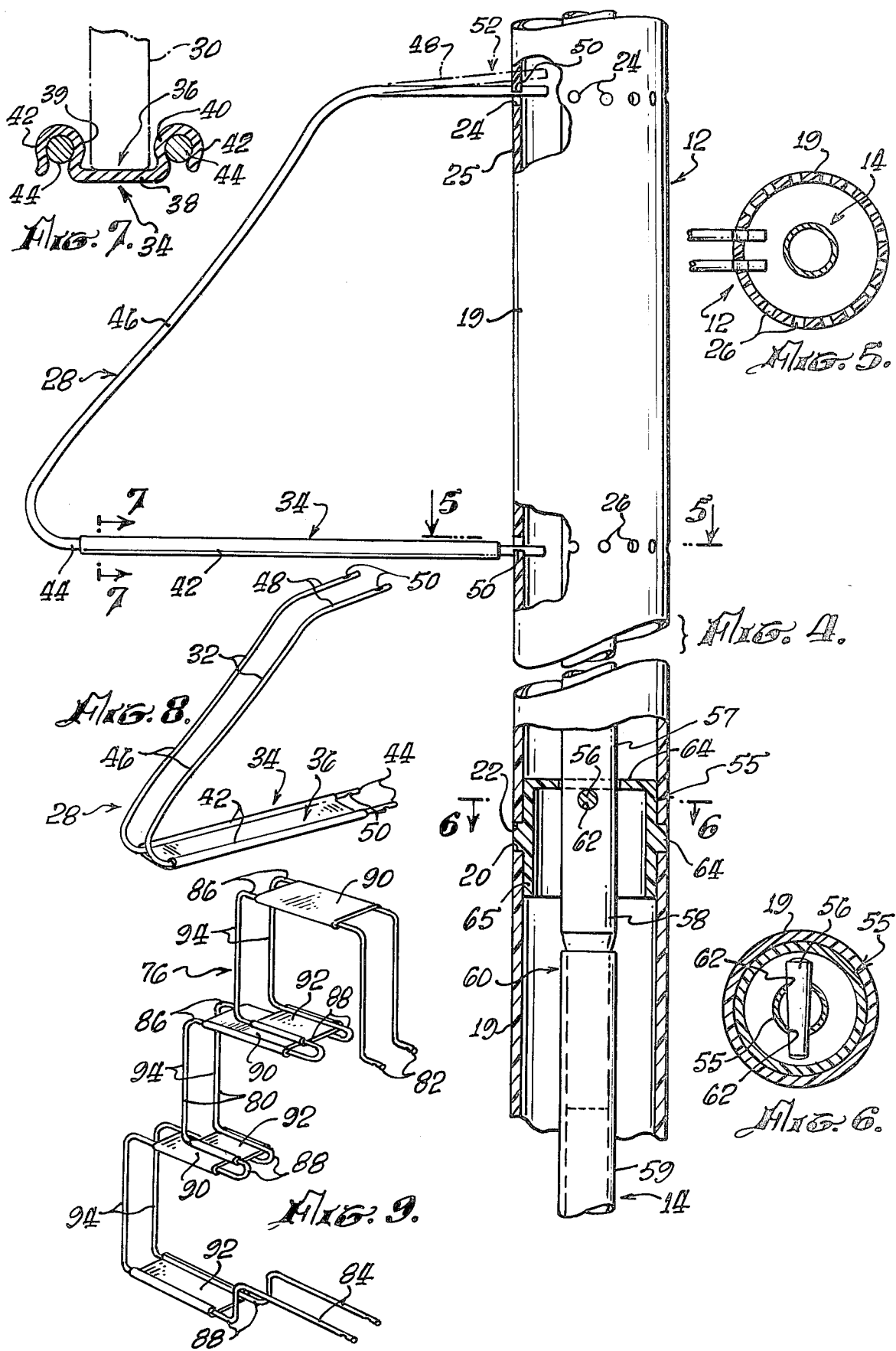

STORAGE AND DISPLAY DEVICE FOR RECORD ALBUMS AND TAPES

BACKGROUND OF THE INVENTION

1. Field of the Invention

This invention relates to a display rack and, more particularly, to a display rack for supporting and storing of record albums and tapes.

2. Description of the Prior Art

As is well known in the art, several problems and difficulties are encountered in providing suitable means for storing and displaying phonograph albums and related tapes.

Various record holders such as the type shown in U.S. Pat. No. 3,214,029 require that the records be stored without the protective cover which is normally associated therewith.

Other devices as shown in U.S. Pat. Nos. 3,170,741, and 3,341,266 make it rather hard to read the protective covers so that an easy selection of the desired album can be made. In addition, none of the above lend themselves to be adaptable for use by both record albums and tapes.

It is well understood that to provide the most suitable storage for records and tapes, particularly, record albums, each album should be stored in its own protective cover in a vertical, upright position, that is, on its edge. First, this arrangement of storing prevents warpage of the recorded disc which when stored in a flat, horizontal arrangement has a tendency to become uneven due to changes in temperature.

Also, it is desirable that both tapes and records be stored on edge, so as to provide maximum use of space and, at the same time, allow for easy access thereto, wherein each album and cassette cover can be readily seen so that the pictures and illustrations can be presented in an attractive mode. Thus, record albums should be stored in such a manner that each album package can be completely viewed, not merely by the end labels thereon, as is the case with many record and tape storage and support devices.

SUMMARY OF THE INVENTION

The present invention comprises a device for storing and displaying both phonograph albums and various size tape cartridges, including the cassette type. Hence, the storage device would comprise a plurality of support racks which are mounted to individual, rotatable, cylindrical housings rotatably supported on a central mounting post. The mounting post can be of any height suitable for the desired number of housings which are vertically arranged in a contiguous manner, wherein each housing rests on a rotatable hub member adapted to allow its support group of racks to rotate therewith about the central post.

A plurality of racks can be removably mounted to each housing so as to radially extend outwardly therefrom in such a manner that the record album can be clearly identified by its protective cover. Various arrangements of racks are contemplated so as to support phonograph albums and various size tapes. However, each rack generally comprises a bracket formed from parallel, juxtaposed, wire frame members wherein flexible spring tension is applied thereto, whereby the free ends of the wire frames can be fixedly received in apertures disposed in the cylindrical housings. The wire frames are held in a spaced relationship with each other by means of an elongated support track. It should be noted, however, that the rack for albums comprises a single bracket, wherein the rack for tapes comprises a continuous series of connected brackets with upper and lower support tracks, whereby one or more tapes can be supported in one rack unit.

It is further contemplated that the device will be arranged to be held in a vertical position between the floor and the ceiling, there being a floor base member and an adjustable spring-loaded engagement device located to engage the ceiling.

OBJECTS AND ADVANTAGES OF THE INVENTION

The present invention has for an important object to provide a device for storing and displaying phonograph albums and tapes, wherein the central mounting post and the rotatable housings are common to both the album racks and tape racks, wherein each are interchangeable therewith.

It is another object of the invention to provide a storage and display rack that includes a plurality of radially extended brackets to allow full view of the particular article supported therein, so as to be readily displayed for easy selection thereof.

It is further another object of the invention to provide a plurality of rotatable racks which can be individually revolved without interfering with adjacent racks.

It is a further object of the invention to provide a display-and-support rack of this character that has relatively few operating parts, and still allow for greatly improved operation.

A still further object of the invention is to provide a device of this character that is simple and rugged in construction, and can be assembled without special tools.

It is still another object of the invention to provide a device of this character that is relatively inexpensive to manufacture.

The characteristics and advantages of the invention are further sufficiently referred to in connection with the accompanying drawings, which represent two embodiments. After considering these examples, skilled persons will understand that variations may be made without departing from the principles disclosed; and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a side-elevational view of the present invention, showing record albums being stored within the attached racks;

FIG. 2 is a top-plan view thereof, showing a plurality of radially extending brackets;

FIG. 3 is a partial, elevational view of the cylindrical housing having racks formed to receive tapes therein;

FIG. 4 is an enlarged, elevational view of the cylindrical support housing with portions thereof broken away;

FIG. 5 is a cross-sectional view taken along line 5—5 of FIG. 4;

FIG. 6 is a cross-sectional view taken along line 6—6 of FIG. 4;

FIG. 7 is an enlarged cross-sectional view taken along line 7—7 of FIG. 4;

FIG. 8 is a perspective view of a phonograph album bracket; and

FIG. 9 is a perspective view of a bracket arranged to store a plurality of tape decks thereon.

DESCRIPTION OF THE PREFERRED EMBODIMENT

Referring more particularly to FIGS. 1 and 2, and 4 through 8, there is shown a device for storing and displaying phonograph albums and the like, generally indicated at 10. This device comprises a plurality of storage racks, designated at 12, wherein each rack 12 is stored in a contiguous, superposed manner, one above the other, said racks being individually rotatable about a central support structure, indicated generally at 14, and having a base support means 16 at the lower end thereof and an adjustable keeper means 18 arranged at the upper end of said support structure 14.

Accordingly, each support rack 12 comprises a cylindrical housing 19 which is coaxially arranged with said central support structure 14 so as to rotate thereto, the housing 19 being provided with upper and lower open ends 20 and 22, respectively.

There are provided a plurality of peripheral apertures 24, wherein a row of equally spaced apertures 24 are disposed in the cylinder wall 25 below the upper end 20 and above the mid-section of said housing 19. A second group of apertures 26 is formed just above and adjacent to the lower open end 22.

These apertures are so arranged as to removably receive album-support brackets, indicated at 28 and seen in FIG. 8. That is, each bracket 28 is designed to support and display the well-known record album 30. Bracket 28 comprises a pair of parallel-positioned, wire-frame members 32 which are secured in spaced parallel relationship by means of an elongated track member 34. Said track member 34 can be of any suitable material, but is preferably made from a suitable plastic. The track member has a channel 36 defined by a flat bottom wall 38 and opposite and upwardly bent side walls 39, 40. Said walls 39 and 40 are additionally provided with bent over flanges extending the length thereof, whereby resilient jaw-like members 42, adapted to fit about the wire frame members, are created thereby.

Accordingly, each opposing wire frame member 32 is rigidly secured within its respective jaw member 42, as seen in FIG. 7. Further, each frame member 32 is formed having a lower, horizontal leg member 44 which, when affixed to said housing, extends radially outwardly therefrom for the full length of said track 34, at which point said frame 32 is bent upwardly and rearwardly therefrom defining a somewhat triangular configuration, this portion of said frame representing arm members 46. The arm member 46 of each frame projects upwardly to a point substantially equal to the distance between upper and lower apertures 24 and 26, respectively, and is then bent rearwardly and substantially horizontally to form upper leg members 48 in a parallel plane to said lower leg members 44.

Locking means are provided at each free end of said upper and lower leg members 44 and 48, respectively, the locking means being formed by transverse grooves 50 wherein said grooves lock into their respective apertures 24 and 26.

Because of the configuration of the wire frame members, there is a spring-biasing tension formed therein, as indicated at 52 in FIG. 4. Thus, legs 44 and 48 must be forced inwardly together so as to enter apertures 24 and 26. Once they are released, grooves 50 will engage the peripheral edge of said apertures.

Thus, the above establishes the racks for supporting record albums 30.

Further, however, the lower open end 22 of each housing is adapted to receive a bearing means defined as a hub member, indicated at 55, which is rotatably supported by a pin 56 that is removably secured to said central support structure, wherein said central support structure 14 comprises an elongated pole 57 having a single post or a plurality of interconnecting posts 58 and 59. FIG. 4 illustrates a typical type of interconnecting means, indicated at 60.

Thus, there is provided a plurality of holes 62 disposed at predetermined points along said pole 57 in which tapered pin 56 is secured therein.

The inturned annular flange 64 of hub 55 is supported on the extended projections of pin 56, and allows hub 55 to rotate thereon. The weight of the rack and the albums 30 causes the lower end of the housing to engage the annular rib member 64 of hub 55; and thus, the two members rotate together. The upper end 20 of the adjacent lower housing is freely journalled to the annular depending wall 65 of hub 55; and, therefore, it does not rotate when the rack positioned above is revolved about pole 57.

In the mode illustrated in FIG. 1, base means 16 is positioned in floor 67; and keeper means 18 is shown engaging ceiling 68 wherein keeper means 18 comprises a slidable abutment member 70 biased upwardly by spring 72. This arrangement is well known and no further detailed description is deemed necessary.

Referring now to the modes of the embodiment shown in FIGS. 3 and 9, there is illustrated a tape rack, generally indicated at 75, having the previously described rotatable housing and hub, but including a bracket 76, as seen in FIG. 9, designed to support and display a plurality of tape decks, or cassette tapes, indicated at 78.

Here again, the support bracket 76 includes a pair of parallel-arranged, wire-frame members 80 held in a side-to-side, spaced relationship to each other, wherein there is formed a pair of upper, horizontal leg members 82 and a lower pair of leg member 84, said legs being provided with locking means 85, as described in the original brackets 28; and wherein the upper and lower legs are so spaced as to be received in corresponding apertures 24 and 26, respectively.

Each wire frame member is formed with a plurality of box-like configurations having upper and lower horizontal bar members 86 and 88, the upper bars 86 being connected by tracks 90, and the lower bars 88 being connected by tracks 92. The upper and lower bars are integrally formed by vertical midsection bars 94.

Accordingly, in each mode, both the record albums and tapes may be readily accessible and displayed to be read from all angles. Moreover, as many as eight brackets can be used in each rack section.

It should also be understood that various designed brackets can be employed simultaneously with each other, that is, album brackets can be used with tape brackets on the same overall unit.

The invention and its attendant advantages will be understood from the foregoing description; and it will be apparent that various changes may be made in the form, construction and arrangement of the parts of the invention without departing from the spirit and scope thereof or sacrificing its material advantages, the arrangements hereinbefore described being merely by way of example; and I do not wish to be restricted to the specific form or uses mentioned, except as defined in the accompanying claims.

The inventor claims:

1. A storage-and-display device for record albums and tape cartridges comprising:
   a central, substantially fixed vertical pole,
   a base member secured to the lower end of said pole,
   a plurality of rack means disposed one above the other in contiguous superposed relation arranged to removably store and display record albums and tape cartridges, including journal means for individual rotation of each rack means, each of said rack means comprising:
   a cylindrical housing having a substantially solid cylindrical vertical wall coaxial with and rotatably supported on said fixed pole,
   at least one wire frame support bracket having wire leg members removably secured to said housing to extend outwardly therefrom,
   mounting means including apertures in said cylindrical housing wall to receive said bracket leg members, the wire frame support bracket providing a spring-retaining action between the bracket and the mounting means,
   locking means disposed on said bracket to engage said mounting means, and
   at least one support track member secured between the wire members and maintaining the members in spaced relation.

2. A storage-and-display device as recited in claim 1, wherein each of said wire-frame members comprises:
   a lower horizontal leg member which, when affixed to said housing, extends radially outwardly therefrom the full length of said track member which is secured thereto;
   said wire frame member being bent upwardly and rearwardly defining an integral arm member; and
   an upper leg member extending from said arm member and bent rearwardly in a substantially horizontal position, said upper leg member being in a substantially parallel plane to said lower leg member.

3. A storage-and-display device as recited in claim 2, wherein:
   said mounting means comprises a plurality of radially extending apertures equally spaced about the solid cylindrical wall of said housing.

4. A storage-and-display device as recited in claim 3, wherein:
   said locking means comprises a transverse groove disposed in said upper and lower leg members of said brackets, and arranged to engage the edge portions of the cylindrical wall defining selected ones of said apertures; and wherein said upper and lower leg members include a biasing force therebetween to provide positive engagement within said apertures.

5. A storage-and-display device according to claim 1, wherein:
   edge portions of the support track member are adapted to fit about the wire members to maintain the wire members in parallel spaced relation and to cooperate therewith to form a supporting structure.

6. A storage-and-display device for record albums and tape cartridges comprising:
   a central, substantially fixed vertical pole,
   a base member secured to the lower end of said pole,
   a plurality of rack means disposed one above the other in contiguous superposed relation arranged to removably store and display record albums and tape cartridges, including journal means for individual rotation of each rack means, said journal means comprising a hub member received over said fixed pole, and a pin removably secured to said pole to rotatably support said hub member, each of said rack means comprising:
   a cylindrical housing having a cylindrical wall coaxial with the pole and rotatably supported on said fixed pole,
   a wire frame support bracket removably secured to said housing, and arranged to extend radially outwardly therefrom,
   said bracket comprising a pair of wire-frame members fixed in parallel spaced relation with each other, each having upper and lower free ends adapted to be received in said mounting means of said housing, the wire-frame members providing a spring-retaining action between the brackets and the mounting means, and an elongated record album-support track member connecting said wire-frame members along the lower portion of said bracket member,
   each of said wire-frame members comprising a lower horizontal leg member which, when affixed to said housing, extends radially outwardly therefrom the full length of said track member which is secured thereto,
   said wire-frame member being bent upwardly and rearwardly defining an integral arm member,
   an upper leg member extending from said arm member and bent rearwardly in a substantially horizontal position, said upper leg member being in a substantially parallel plane to said lower leg member,
   mounting means in said cylindrical housing wall to receive said bracket, said mounting means comprising a plurality of apertures equally spaced about the cylindrical wall of said housing, the wire frame support bracket providing a spring-retaining action between the bracket and the mounting means, and
   locking means disposed on said bracket to engage said mounting means, said locking means comprising a transverse groove disposed in said upper and lower leg members of said brackets, and arranged to engage the edge portions of the cylindrical wall defining selected ones of said apertures, and wherein said upper and lower leg members include a biasing force therebetween to provide positive engagement within said apertures.

7. A storage-and-display device for record albums and tape cartridges comprising:
   a central, substantially fixed vertical pole,
   a base member secured to the lower end of said pole,
   a plurality of rack means disposed one above the other in contiguous superposed relation arranged to removably store and display record albums and tape cartridges, including journal means for individual rotation of each rack means, each of said rack means comprising:
   a cylindrical housing having a cylindrical wall coaxial with the pole and rotatably supported on said fixed pole,
   a wire frame support bracket removably secured to said housing, and arranged to extend radially outwardly therefrom, mounting means in said cylindrical housing wall to receive said bracket, the wire frame support bracket providing a spring-retaining action between the bracket and the mounting means, said bracket comprising a pair of wire frame members fixed in parallel spaced relation with each other having upper and lower free ends adapted to be received in said mounting means of said housing, said wire frame being bent with a plurality of sequential, box-like configurations formed therein, and a plurality of upper and lower track members arranged to removably receive and support individual tape cartridges therebetween, said track members being affixed to each pair of wire-frame members, holding them in a spaced juxtaposed arrangement, and locking means disposed on said bracket to engage said mounting means.

8. A storage-and-display device as recited in claim 7, wherein:
said mounting means comprises a plurality of apertures equally spaced apart about the cylindrical wall of said housing.

9. A storage-and-display device as recited in claim 8, wherein:
said locking means comprises a transverse groove is each of said upper and lower free end portions of said frame members to engage edge portions of the cylindrical wall defining selected ones of said apertures.

10. A storage-and-display device as recited in claim 9, wherein said journal means comprises:
a hub member received over said fixed pole; and
a pin removably secured to said pole to rotatably support said hub thereon.

* * * * *